A. L. PARCELL.
Friction-Gearing.

No. 151,506. Patented June 2, 1874.

Witnesses.

Inventor.
Albert L. Parcell,
by William H. Low,
Atty.

UNITED STATES PATENT OFFICE.

ALBERT L. PARCELL, OF ONEONTA, NEW YORK.

IMPROVEMENT IN FRICTION-GEARINGS.

Specification forming part of Letters Patent No. 151,506, dated June 2, 1874; application filed April 25, 1874.

*To all whom it may concern:*

Be it known that I, ALBERT L. PARCELL, of Oneonta, in the county of Otsego and State of New York, have invented a new and Improved Device for Driving Spinners, Reels, and other light machines, of which the following is a full and exact description, reference being had to the accompanying drawing making a part of this specification, in which—

Figure 1:
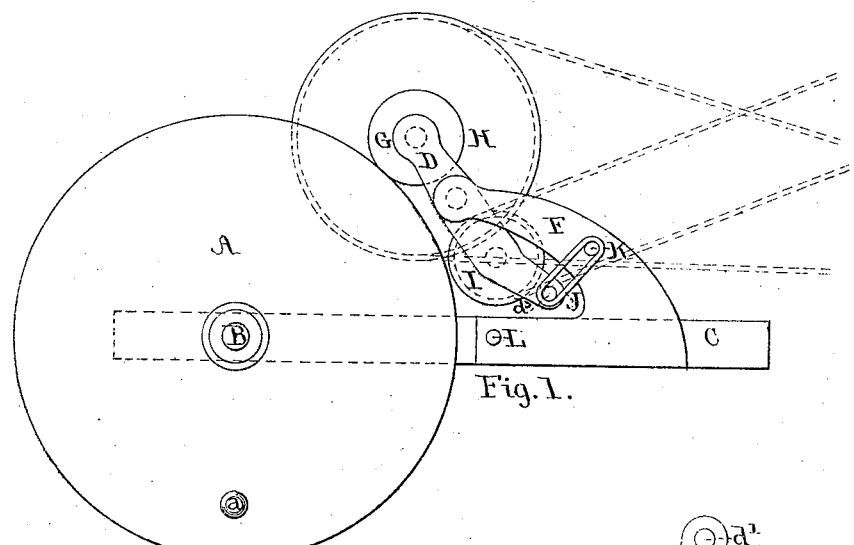
Figure 3:
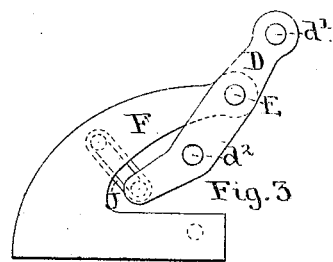
Figure 2:
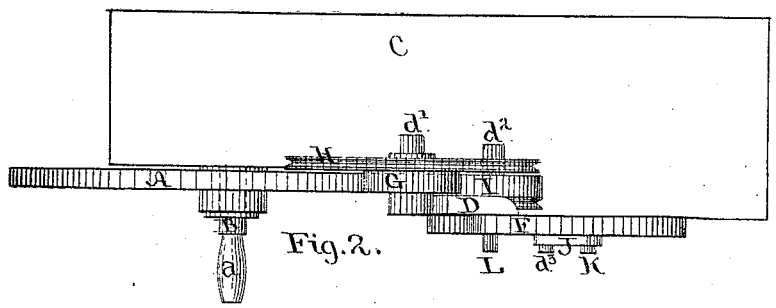

Figure 1 is a front elevation, Fig. 2 a plan view, and Fig. 3 a rear elevation, of the rocker-arm and bracket.

My invention consists of a combination of friction-wheels, as herein described, whose points of contact are held together by means of a spring or springs, so as to form an elastic or yielding connection between them that will produce sufficient adhesion of the wheels, and allow for any slight inequality that may exist upon their surface.

As shown in the drawings, A is the driving friction-wheel, provided with a handle, $a$, and revolving on the stud B secured to the bed-piece C. D is a rocker-arm working on the stud E of the bracket F secured to the bed-piece C. At its upper end the rocker-arm D is provided with a stud, $d^1$, which forms a bearing for the small friction-wheel G and grooved pulley H, both of which may be cast together. The rocker-arm D is also provided, below its center of oscillation upon the stud E, with another stud, $d^2$, as a bearing for the small friction-wheel I, which has a groove turned in its periphery for the purpose of carrying a driving-band when it is necessary to transmit motion from it. J is a spring, of india-rubber or other elastic material, connected to the stud $d^3$ in the lower end of the rocker-arm D, and so arranged that it can be connected to either of the studs K or L on the bracket F as occasion may require.

It will readily be seen that, by attaching the spring J to the stud K, the friction-wheel G is brought into contact with the driving-wheel A, and a high rate of speed may be derived from the grooved pulley H; and that, by changing the spring to the stud L, the friction-wheels A and I are brought into contact, and a reduced rate of speed obtained thereby. It will also be seen that, by throwing either of the small friction-wheels into contact with the driving-wheel A, the wheel at the other end of the rocker-arm is withdrawn from service. By means of the spring J a sufficient degree of adhesion of the wheels may be obtained for driving light machines, like spinners, reels, &c.

In constructing friction-wheels of this character, wherein the wheels have been held in contact by means of screws and other unyielding devices, the expense for reducing their surfaces of contact by turning them to true circles, so as to meet the necessities of such a construction, has so greatly increased their cost as to render them too expensive for the purpose for which they are designed.

By means of the yielding pressure obtained by the spring J, I am enabled to use wheels, having ordinarily true peripheries, as they come from the founder's hands, and without being turned, thereby greatly reducing the cost of construction.

I claim as my invention—

The combination of the driving-wheel A and friction-wheels G and I with the rocker-arm D having a stud, $d^3$, thereon, bracket F having the studs K and L, and adjustable spring J, when constructed and arranged to operate substantially as and for the purpose specified.

ALBERT L. PARCELL.

Witnesses:
D. W. FORD,
JAMES STEWART.